United States Patent
Schramm et al.

(10) Patent No.: US 7,824,460 B2
(45) Date of Patent: Nov. 2, 2010

(54) DIESEL PARTICULATE FILTER ASSEMBLY

(75) Inventors: Eric J. Schramm, Port Clinton, OH (US); Phil P. Treier, Bloomdale, OH (US)

(73) Assignee: Honeywell International Inc., Morristown, NJ (US)

( * ) Notice: Subject to any disclaimer, the term of this patent is extended or adjusted under 35 U.S.C. 154(b) by 275 days.

(21) Appl. No.: 11/971,867

(22) Filed: Jan. 9, 2008

(65) Prior Publication Data

US 2008/0209868 A1     Sep. 4, 2008

Related U.S. Application Data

(60) Provisional application No. 60/884,214, filed on Jan. 9, 2007.

(51) Int. Cl.
*B01D 46/00* (2006.01)
*B01D 39/20* (2006.01)

(52) U.S. Cl. ............................. 55/484; 55/483; 55/521; 55/523; 55/DIG. 30; 55/DIG. 31

(58) Field of Classification Search .................. 55/482, 55/483, 484, 485, 521, 523, DIG. 30, DIG. 31
See application file for complete search history.

(56) References Cited

U.S. PATENT DOCUMENTS

| | | | | |
|---|---|---|---|---|
| 296,758 | A | * | 4/1884 | Kutsche ........................ 55/484 |
| 4,129,429 | A | * | 12/1978 | Humbert et al. ............... 55/484 |
| 4,636,232 | A | | 1/1987 | McDowell |
| 4,873,069 | A | | 10/1989 | Weaver et al. |

(Continued)

FOREIGN PATENT DOCUMENTS

JP            04-100508           4/1992

(Continued)

OTHER PUBLICATIONS

International Search Report Dated May 27, 2008, International Application No. PCT/US2008/050674.

(Continued)

*Primary Examiner*—Michael A Marcheschi
*Assistant Examiner*—Robert A Clemente
(74) *Attorney, Agent, or Firm*—Cantor Colburn LLP

(57) ABSTRACT

A filter assembly is disclosed herein the filter assembly comprising: a plurality of stackable elements each comprising a frame defining a perimeter surrounding a filter media disposed within the frame, the filter media being configured for use as a diesel particulate filter and capable of being regenerated at a temperature greater than 350 degrees Celsius, each frame being configured to have either a first feature on a first surface of the frame or a second feature on a second surface of the frame or both a first feature on a first surface of the frame and a second feature on a second surface of the frame, the first feature being configured to mate with the second feature; and the first surface of each of the plurality of stackable elements further comprises an inlet opening on one end of the frame configured to align with an inlet opening on the second surface of each of the plurality of stackable elements such that a plurality of openings are defined on only one side of the filter assembly, the plurality of openings providing fluid communication to the filter media.

14 Claims, 1 Drawing Sheet

U.S. PATENT DOCUMENTS

| | | | | |
|---|---|---|---|---|
| 4,923,487 A | * | 5/1990 | Bogart et al. | 55/482 |
| 4,935,042 A | | 6/1990 | Sudo et al. | |
| 4,960,449 A | * | 10/1990 | Yonushonis | 55/523 |
| 5,087,272 A | | 2/1992 | Nixdorf | |
| 5,228,891 A | * | 7/1993 | Adiletta | 55/484 |
| 5,457,945 A | * | 10/1995 | Adiletta | 55/301 |
| 5,470,364 A | * | 11/1995 | Adiletta | 55/484 |
| 5,879,423 A | * | 3/1999 | Luka et al. | 55/482 |
| 6,840,986 B1 | * | 1/2005 | Koslow | 96/135 |
| 6,913,059 B2 | | 7/2005 | Nixdorf | |

FOREIGN PATENT DOCUMENTS

| | | |
|---|---|---|
| JP | 04-114710 | 4/1992 |
| JP | 07-026932 | 1/1995 |
| JP | 18-205061 | 8/2006 |
| JP | 18-233939 | 9/2006 |

OTHER PUBLICATIONS

Written Opinion of International Searching Authority Dated May 27, 2008, international Application No. PCT/US2008/050674.

* cited by examiner

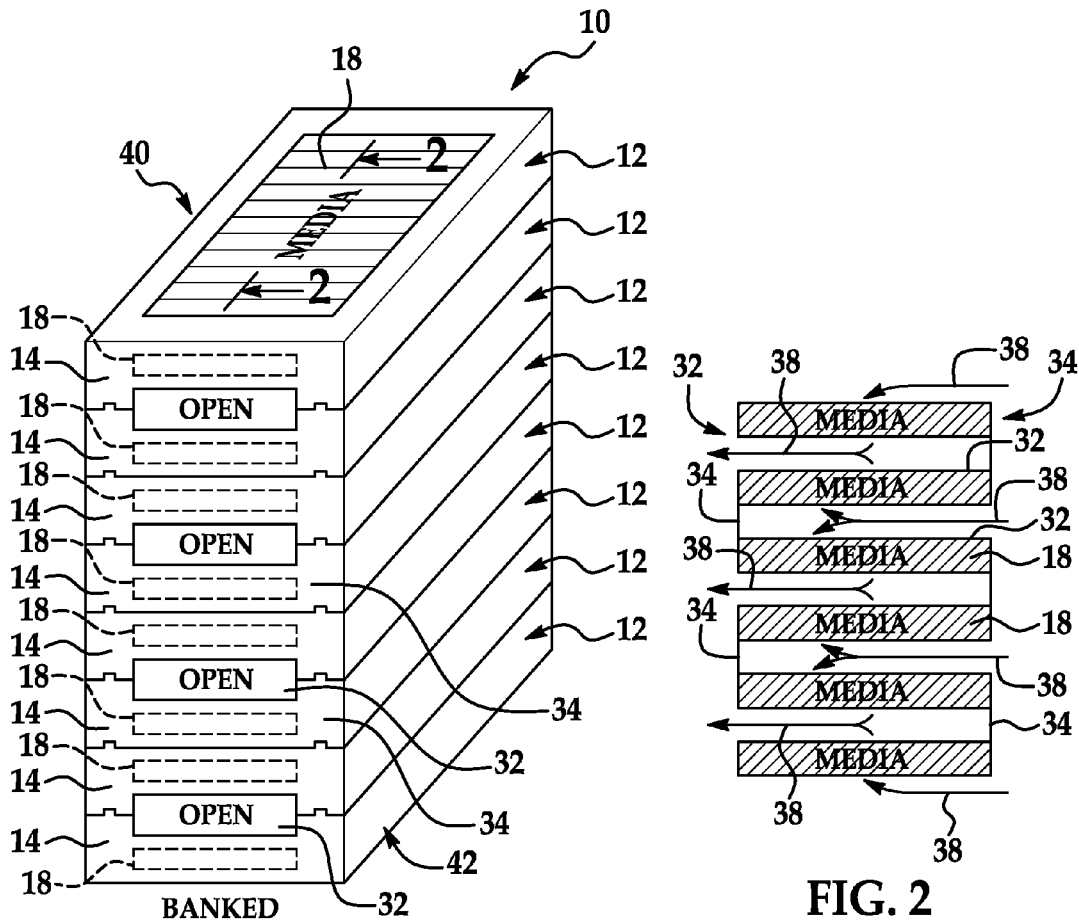
FIG. 1
FIG. 2
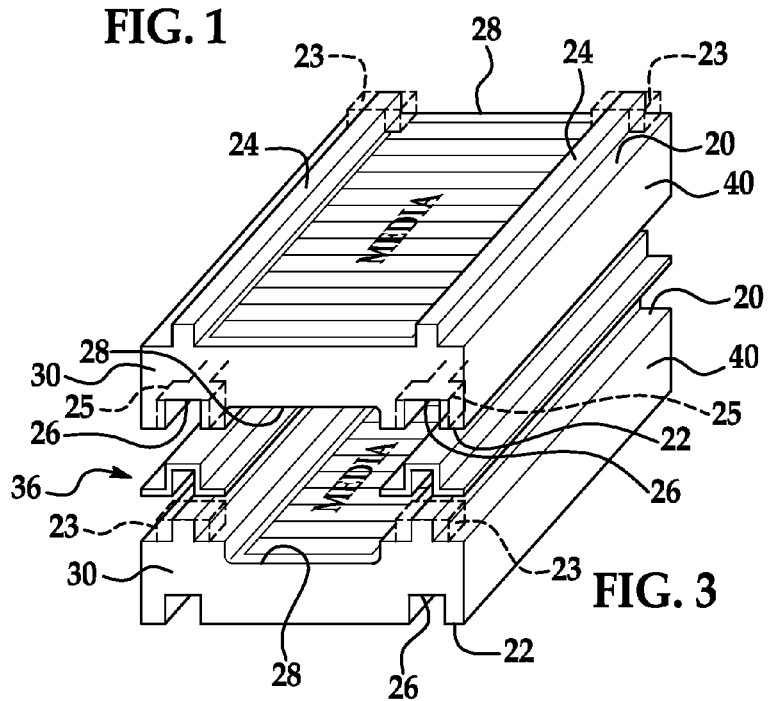
FIG. 3

DIESEL PARTICULATE FILTER ASSEMBLY

CROSS REFERENCE TO RELATED APPLICATIONS

This application claims the benefit of U.S. Provisional Patent Application Ser. No. 60/884,214 filed Jan. 9, 2007, the contents of which are incorporated herein by reference thereto.

BACKGROUND

The present invention relates to particulate filters for diesel exhaust systems. More particularly, the present invention relates to particulate filter assemblies that can be incorporated into diesel exhaust treatment devices.

Because regulatory agencies have recently mandated the reduction of particulate emissions in diesel engines, there has been increased activity in the development of diesel particulate filters, that is, exhaust emission filters for diesel engines. The role of a typical diesel particulate filter is to trap and remove the particulate components of the diesel exhaust stream, which include diesel soot and aerosols such as ash particulates, metallic abrasion particles, sulfates, and silicates, to prevent their discharge from the tailpipe.

Diesel particulate filters should provide long-term operation without diminishing the filtration efficiency of the filter and performance of the engine. Factors related to the performance of diesel particulate filters include but are not limited to high temperatures (e.g., up to 1400° C.), capability to store soot and ash, pressure loss, low thermal mass, stability, and durability. In addition, manufacturing costs and assembly volume are important considerations.

The filtration is achieved by a porous structure (e.g., filter media) that allows transmission of the fluid phase but stops or captures diesel particulate matter larger than a threshold particle size. Variations in the filter's efficiency are a function of the pore size of the filter media and particle size of the diesel particulate matter thus, every filter has a finite capacity, and as the flow through a diesel particulate filter decreases exhaust backpressure increases, which in some instances is undesirable. Due to the low bulk density of diesel particulates, diesel particulate filters can quickly accumulate considerable volumes of soot. To prevent filter pore clogging that causes backpressure to increase, thereby increasing load on the engine, the trapped particulate material is burned from the filter by continuous or periodic oxidation in the process of regeneration.

Accordingly, it is desirable to provide a filter assembly that can vary in geometry and be capable of having accumulated particles removed therefrom.

SUMMARY OF THE INVENTION

Disclosed herein is a filter assembly, comprising: a plurality of stackable elements each comprising a frame defining a perimeter surrounding a filter media disposed within the frame, the frame having a first surface and a second surface, the first surface having a first feature and the second surface having a second feature, the first feature being configured to mate with the second feature.

In one exemplary embodiment, a filter assembly is provided, the filter assembly comprising: a plurality of stackable elements each comprising a frame defining a perimeter surrounding a filter media disposed within the frame, the filter media being configured for use as a diesel particulate filter and capable of being regenerated at a temperature greater than 350 degrees Celsius, each frame being configured to have either a first feature on a first surface of the frame or a second feature on a second surface of the frame or both a first feature on a first surface of the frame and a second feature on a second surface of the frame, the first feature being configured to mate with the second feature; and the first surface of each of the plurality of stackable elements further comprises an inlet opening on one end of the frame configured to align with an inlet opening on the second surface of each of the plurality of stackable elements such that a plurality of openings are defined on only one side of the filter assembly, the plurality of openings providing fluid communication to the filter media.

In another exemplary embodiment, a filter assembly is provided, the filter assembly comprising: a plurality of stackable elements each comprising a frame defining a perimeter surrounding a filter media disposed within the frame, the filter media being configured for use as a diesel particulate filter and capable of being regenerated at a temperature greater than 350 degrees Celsius, the frame having a first surface and a second surface, the first surface having a first feature and the second surface having a second feature, the first feature being configured to mate with the second feature of another one of the plurality of filter elements and the first feature of each of the plurality of stackable elements is received in the second feature of an adjacent one of the plurality of stackable elements; a first outer stackable element positioned on one end of the plurality of stackable elements, the first outer stackable element having a frame defining a perimeter surrounding a filter media disposed within the frame, the frame of the first outer stackable element having a first surface and a second surface, the second surface having a feature configured to mate with the first feature of one of the plurality of stackable elements adjacent to the first outer stackable element; and a second outer stackable element positioned on another end of the plurality of stackable elements, the second outer stackable element having a frame defining a perimeter surrounding a filter media disposed within the frame, the frame of the second outer stackable element having a first surface and a second surface, the first surface having a feature configured to mate with the second feature of one of the plurality of stackable elements adjacent to the second outer stackable element.

In still another exemplary embodiment a method of assembling a filter assembly is provided, the method comprising: stacking a plurality of stackable elements upon each other each of the plurality of stackable elements comprising a frame defining a perimeter surrounding a filter media disposed within the frame, the filter media being configured for use as a diesel particulate filter and capable of being regenerated at a temperature greater than 350 degrees Celsius, the frame having a first surface and a second surface, the first surface having a first feature and the second surface having a second feature, the first feature being configured to mate with the second feature of another one of the plurality of filter elements and the first feature of each of the plurality of stackable elements is received in the second feature of an adjacent one of the plurality of stackable elements; stacking a first outer stackable element on one end of the plurality of stackable elements, the first outer stackable element having a frame defining a perimeter surrounding a filter media disposed within the frame, the frame of the first outer stackable element having a first surface and a second surface, the second surface having a feature configured to mate with the first feature of one of the plurality of stackable elements adjacent to the first outer stackable element; and stacking a second outer stackable element on another end of the plurality of stackable elements, the second outer stackable element having a frame defining a perimeter surrounding a filter media disposed within the frame, the frame of the second outer stackable element having a first surface and a second surface, the first surface having a feature configured to mate with the second feature of one of the plurality of stackable elements adjacent to the second outer stackable element, and the filter assembly further comprises a sealing material disposed between each of the first feature and the second feature of the plurality of stackable elements and the first and second outer stackable elements and the first feature of each of the plurality of stackable elements and the first surface of each of the plurality of stackable elements and the second outer stackable element further comprises an inlet opening on one end of the frame configured to align with an inlet opening on the second surface of each of the plurality of stackable elements and the first outer stackable element such that a plurality of openings are defined on one side of the filter assembly, the plurality of openings providing fluid communication to the filter media and the first feature of each of the plurality of stackable elements and the feature of the second outer stackable element is a protrusion and the second feature of each of the plurality of stackable elements and the feature of the first outer stackable element is a recess configured to receive the protrusion, each of the protrusions and the recesses being configured to only allow the inlet openings to be aligned when the protrusions are received within the recesses.

BRIEF DESCRIPTION OF THE DRAWINGS

FIG. 1 is a perspective view of an exemplary embodiment of a filter assembly in accordance with the present invention;

FIG. 2 is a cross-sectional view along lines 2-2 of FIG. 1; and

FIG. 3 is an exploded view of a portion of the filter assembly in accordance with an exemplary embodiment of the present invention.

DETAILED DESCRIPTION OF EXEMPLARY EMBODIMENTS

Exemplary embodiments of filter assemblies in accordance with the present invention will now be described with reference to the drawings. The exemplary filter assemblies described herein are configured to be incorporated within housing canisters to form exhaust treatment devices that are in fluid connection with the exhaust gas pipes of a diesel engine. As opposed to conventional wall-flow filter assemblies, the exemplary filter assemblies described herein can be modified for incorporation into housing canisters of many varying dimensions and applications. Thus, when a filter assembly is incorporated in this manner, exhaust emissions that are discharged from a diesel engine to flow through the exhaust pipe are directed across the filter assembly so that particulates contained in the exhaust emissions are collected by a filter media disposed within the filter assembly. In one non-limiting exemplary embodiment, the filter media is pleated to increase filtration area. In one exemplary embodiment the collected particulates can then be heated and incinerated to regenerate the filter assembly using one of several known techniques.

In another exemplary embodiment and as will be discussed herein the filter assembly is capable of being disassembled and the collected particulates are blown out or sucked from the filter media.

In accordance with an exemplary embodiment of the present invention, a filter assembly 10 that can be configured to be incorporated into an exhaust treatment device is illustrated in FIGS. 1 and 2. Filter assembly 10 has a plurality of stackable elements 12, each having a frame 14 surrounding a filter media 18, which is configured to remove particulate matter from an exhaust flow. In another exemplary embodiment, the frame only surrounds a portion of the filter media.

In one non-limiting exemplary embodiment, the filter element is disposed within and supported by the ceramic frame, and comprises a ceramic fiber material, which in accordance with non-limiting exemplary embodiments of the present invention, is selected from the group consisting of silicon carbide, silicon nitride, cordierite, aluminum oxide, alumina silicate, and combinations thereof. In accordance with an exemplary embodiment of the present invention the ceramic frame and/or the ceramic media can be formed by a ceramic injection molding or casting process.

Each frame has a first side or upper surface 20 and a second side or lower surface 22. The first side has a first feature or features 24 and the second side has a second feature or features 26, the first feature being configured to mate with the second feature. Thus, each of the elements are stackable upon each other to define a filter assembly. In addition, each frame has an inlet opening 28 at a first peripheral edge 30 and a closed edge formed by the remaining perimeter of the frame wherein the inlet opening of each frame is aligned with a complimentary inlet opening of another frame such that an open end 32 and a closed end 34 are provided when the elements are stacked upon each other. It being understood that the ends of the frame not comprising opening 28 will be configured to seal and mate to each other, through the first and second features, such that only an open end is provided on one side of each pair of stackable members stacked to each other.

In addition and in one exemplary embodiment, a sealing material 36 is disposed between the first and second features of the stackable elements. In accordance with a non-limiting exemplary embodiment, an example of the sealing material 36 is a ceramic matting currently available from Unifrax or equivalents thereof. In accordance with an exemplary embodiment of the present invention the sealing material provides a means for sealing peripheral edges 40 of the stackable elements. In one non-limiting exemplary embodiment, the sealing material consists of a sealing glass that would rigidly bond the elements or groups of elements together.

In accordance with an exemplary embodiment and as illustrated in FIG. 2, the plurality of stackable elements are configured such that openings 32 are alternately arranged with closed ends 34. In accordance with an exemplary embodiment and in order to ensure that each of the plurality of stackable elements are arranged such that the openings 28 align with each other (e.g., opening 28 positioned on either an upper or lower surface of the frame) thus providing a mistake proof method for stacking the plurality of stackable elements feature 24 and 26 are configured to have a keyway or fit wherein only one orientation of the two stackable elements is possible. Accordingly, the features 24 and 26 are also configured to provide this error proof assembly. Non-limiting examples are illustrated in FIG. 2 by the dashed lines and include configuring a portion 23 of each first feature 24 and a portion 25 of each second feature 26 such that only openings 28 of each element can be aligned with each other (e.g., the portion 23 of first feature 24 proximate to opening 28 is larger than the remaining portion of second feature 24, which is not proximate to opening 28 or in other words a portion 23 of the first feature 24 located proximate to the opening will not align with a portion of the second feature that is proximate to the end portion or surface that does not have an opening 28) thus, the end of the stackable elements must be aligned properly for fit of the features together. Although larger and smaller portions are illustrated any configuration is contemplated as long as the desired effect is achieved (e.g., openings 28 of each element align with each other to provide the alternating arrangement shown in FIG. 3). Moreover, it may only be necessary to configure a portion 23 of only one of the two first features 24 illustrated and a complimentary portion 25 of only one of the two second features 26 illustrated on each of the plurality of stackable elements such that only openings 28 can be aligned with each other wherein a closed end 34 (e.g., no openings in the sides of the frame) and an open end 32 (e.g., opening provided in the sides of the frame) of the filter assembly is provided in an alternating fashion as illustrated in the attached Figures.

Once stacked upon each other to form a filter assembly a plurality of fluid flow paths illustrated by arrows 38 provide a means for filtering fluid passing therethrough. In addition, and by providing the alternating fluid flow path a greater surface area of filtration media is provided. Moreover and since multiple fluid flow paths are provided, the filter assembly provides a plurality of surface areas of media directly exposed to the inlet exhaust gas path thus preventing the inlet of the filter from becoming clogged.

In accordance with an exemplary embodiment of the present invention the filter assembly will also comprise a first outer stackable element 40 and a second outer stackable element 42 positioned on an opposite end of the plurality of stackable elements, the first outer stackable element having a frame defining a perimeter surrounding a filter media disposed within the frame, the frame of the first outer stackable element having a first surface and a second surface, the second surface having a feature configured to mate with the first feature of one of the plurality of stackable elements adjacent to the first outer stackable element and the second outer stackable element having a frame defining a perimeter surrounding a filter media disposed within the frame, the frame of the second outer stackable element having a first surface and a second surface, the first surface having a feature configured to mate with the second feature of one of the plurality of stackable elements adjacent to the second outer stackable element.

Although FIG. 1 illustrates the first and second outer stackable elements with a filter media disposed therein it is also contemplated and depending upon the application the filter assembly is being used in that the first and second outer elements may be configured to not have filter media therein to provide a means for sealing the top and bottom end of the filter assembly such that only open end 32 are provided on either side of the assembly. This will, of course, depend on the applications the filter assembly is being used in.

Accordingly, exemplary embodiments of the present invention relate to a means for effectively stacking a plurality of panel-style diesel particulate filters in a bank to increase media area, which in turn increases particulate holding capacity of the filter.

The exhaust treatment device may optionally include a means for sealing the filter assembly in its aligned position. These means for sealing may include, for example, a compression of the front panel and/or the back panel with the matting layers, a gasket, or any other known means, which in at least one embodiment allows for removal of the stacked elements from each other to facilitate cleaning wherein the entrained particulates are removed with any suitable process including but not limited to sucking or blowing the particulates into a disposal device.

In accordance with an exemplary embodiment, a plurality of elements are stacked to provide a filter assembly into a desired configuration having alternating inlet openings. Thereafter, and as the filter becomes clogged with particulate the entire assembly can be removed from its housing (not shown) and disassembled wherein the entrained particulates can be removed via any suitable process including but not limited to applying a suction force, reverse back flow or by regenerating (e.g., applying a large amount of heat) to each of the elements. Moreover and since each of the elements are separable from each other, this removal process can be independently applied to each of the elements wherein the independent application of this removal process provides additional efficiencies. Thereafter, the elements are restacked and inserted into the housing for reuse. In addition, and during this process the sealing material may also be replaced as well as and damaged filter elements.

Alternatively, the filter elements are regenerated in the system without removing the filter by for example a regeneration process wherein the filter elements are heated to temperatures greater than 350 degrees Celsius to burn off the captured particulates.

In one exemplary embodiment of the present invention regeneration of the diesel particulate filter is performed by burning the captured particulate matter, the temperature at which the capture particulate matter is actively burnt can be 650 degrees Celsius or more, and the temperature at which particulate matter starts to burn is approximately 350 degrees Celsius. Accordingly, and in order to start regeneration, the temperature of the exhaust gas must be increased to 350 degrees Celsius or more. The exhaust gas and/or filter assembly being heated to these temperatures using technologies known to those skilled in the related arts. In being understood that the aforementioned temperature ranges are merely provided as exemplary examples and exemplary embodiments of the present invention are not limited to the aforementioned temperature ranges as temperatures above and below these ranges are considered to be within the scope of exemplary embodiment of the present invention. Of course, and wherein regeneration using heated exhaust gases and/or exhaust devices is/are employed the filter media and the filter frame have to be constructed out of materials that will withstand these higher temperatures and the cycling from hotter to cooler temperatures before, during and after these regeneration events.

In accordance with an exemplary embodiment of the present invention the ceramic frame 14 may comprise any configuration and in one non-limiting exemplary embodiment a ceramic material that can be formed from a ceramic injection molding or casting process.

In accordance with an exemplary embodiment of the present invention, the number and configuration of the elements illustrated in the Figures should be considered as non-limiting examples. It is contemplated that alternative exemplary embodiments of such a filter assembly could, for instance, include of any number of elements and configurations. The number of stacked elements, as well as their dimensions, can be varied and depend on required back pressure, filtration, size, manufacturing, and other requirements of a particular application. Therefore, as opposed to conventional wall-flow filter assemblies, the present exemplary filter assembly can be modified for incorporation into housing canisters of many varying dimensions and applications. Moreover and if necessary, the filter elements may be stacked directly into the housing.

Exemplary embodiments of filter assemblies in accordance with the present invention can be employed to further increase filtration efficiency and reduce backpressure beyond conventional filter assemblies.

Non-limiting exemplary filter elements of the present invention can be constituted of a ceramic fiber material such as, for example, one comprising silicon carbide, silicon nitride, cordierite, alumina, aluminum oxide, alumina silicate, and combinations thereof and/or ceramic fibers, such as those described in U.S. Pat. No. 5,087,272, those described in U.S. Pat. No. 4,873,069, aluminum oxide fibers from Saffil of Berwyn, Pa., alumino silicate fibers from Thermal Ceramics of Augusta, Ga., or combinations thereof, all of which may be suitable for inclusion in a filter element of exemplary embodiments of the present invention. In accordance with another exemplary embodiment the media may be formed by the methods of U.S. Pat. No. 6,913,059 the contents of which are incorporated herein by reference thereto. Following formation of the ceramic fiber-based web, the fibers can be treated with a binder assist agent, dried, and at least partially bonded to neighboring fibers using the inorganic, preferably ceramic, binder. Each element can include multiple layers of filter media. The use of multiple media layers can increase the soot capacity of a filter element by overcoming the plugging that occurs in the top 20-30% of a single layer media, thereby enabling greater soot penetration and reducing regeneration frequency.

Exemplary embodiments of filter assemblies in accordance with the present invention may be applicable to an exhaust treatment device used for any combustion-type system such as, for example, an engine, a furnace, or any other system known in the art where the removal of gaseous compounds and/or particulate matter from an exhaust flow is desirable. It is also contemplated that such filter assemblies may be used with a non-combustion type system such as, for example, a dust collection system.

By keying (dove tailing for example) the individual diesel particulate filter elements they can be securely stacked one on top of the other. In accordance with an exemplary embodiment multiple diesel particulate filters can be stacked to increased media to the desired area. The keying system can also provide a method for spacing the individual diesel particulate filters apart to allow for inlet and outlet exhaust flow. In one exemplary embodiment the block geometry of the bank diesel particulate filters also provides an effective area around which to "can" the diesel particulate filter into the exhaust system.

Frames for the individual diesel particulate filters could be made from a variety of materials in a variety of ways. For example, ceramic frames can be ceramic injection molded or cast to shape. In addition, an effective seal between the individual diesel particulate filter elements can be provided by a ceramic matting or other appropriate material that could be cut to the size and geometry of the filter elements and then be placed in between each filter (see the attached Figures).

The modular design of these diesel particulate filter elements and their resulting assembly offers easy adaptability for multiple applications. For example, a standard size individual diesel particulate filter can be manufactured and the numbers in the stack or bank can be varied to accommodate a specific application.

Reference is also made to the following patent applications: U.S. Provisional Application Ser. No. 60/884,213, filed Jan. 9, 2007; U.S. Provisional Application Ser. No. 60/884,215, filed Jan. 9, 2007, U.S. Provisional Application Ser. No. 60/910,177, filed Apr. 4, 2007; U.S. Provisional Application Ser. No. 60/910,165, filed Apr. 4, 2007; and U.S. Provisional Application Ser. No. 60/944,355, filed Jun. 15, 2007; the contents each of which is incorporated herein in their entirety by reference thereto.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A filter assembly, comprising:
   a plurality of stackable elements each comprising a frame defining a perimeter completely surrounding a filter media disposed within the frame, the filter media being configured for use as a diesel particulate filter and capable of being regenerated at a temperature greater than 350 degrees Celsius, the frame having a first surface and a second surface, the first surface having a first feature and the second surface having a second feature, the first feature being configured to mate with the second feature of another one of the plurality of filter elements and the first feature of each of the plurality of stackable elements is received in the second feature of an adjacent one of the plurality of stackable elements;
   a first outer stackable element positioned on one end of the plurality of stackable elements, the first outer stackable element having a frame defining a perimeter completely surrounding a filter media disposed within the frame, the frame of the first outer stackable element having a first surface and a second surface, the second surface having a feature configured to mate with the first feature of one of the plurality of stackable elements adjacent to the first outer stackable element; and
   a second outer stackable element positioned on another end of the plurality of stackable elements, the second outer stackable element having a frame defining a perimeter completely surrounding a filter media disposed within the frame, the frame of the second outer stackable element having a first surface and a second surface, the first surface having a feature configured to mate with the second feature of one of the plurality of stackable elements adjacent to the second outer stackable element, wherein the first surface of each of the plurality of stackable elements and the second outer stackable element further comprises an inlet opening on one end of the frame and the second surface of each of the plurality of stackable elements and the first outer stackable element further comprises an inlet opening on one end of the frame such that a plurality of openings are defined on one side of the filter assembly, the plurality of openings providing fluid communication to the filter media.

2. The filter assembly as in claim 1, wherein the filter media comprises a ceramic media having a series of pleated contours.

3. The filter assembly as in claim 1, wherein the filter media of the plurality of filter media elements is comprised of a ceramic fiber material and the ceramic fiber material is selected from the group consisting of silicon carbide, silicon nitride, cordierite, aluminum oxide, alumina silicate, and combinations thereof.

4. The filter assembly as in claim 1, wherein the frame is comprised of a material selected from the group consisting of ceramics, metals, and polymers and each frame has an inlet opening at a first peripheral edge and a closed edge formed by the remaining perimeter of the frame wherein the inlet opening of each frame is aligned with a complimentary inlet opening of another frame such that an open end and a closed end are provided when the elements are stacked upon each other.

5. The filter assembly as in claim 1, wherein the filter media and the frame are formed from a ceramic injection molding process.

6. The filter assembly as in claim 1, wherein the first feature of each of the plurality of stackable elements and the feature of the second outer stackable element is a protrusion and the second feature of each of the plurality of stackable elements and the feature of the first outer stackable element is a recess configured to receive the protrusion.

7. The filter assembly as in claim 1, wherein the first feature of each of the plurality of stackable elements and the feature of the second outer stackable element is an elongated protrusion and the second feature of each of the plurality of stackable elements and the feature of the first outer stackable element is a channel configured to receive the protrusion.

8. The filter assembly as in claim 1, wherein the filter assembly further comprises a sealing material disposed between each of the first feature and the second feature of the plurality of stackable elements and the first and second outer stackable elements.

9. The filter assembly as in claim 8, wherein the first feature of each of the plurality of stackable elements and the feature of the second outer stackable element is a protrusion and the second feature of each of the plurality of stackable elements and the feature of the first outer stackable element is a recess configured to receive the protrusion.

10. A filter assembly, comprising:
a plurality of stackable elements each comprising a frame defining a perimeter surrounding a filter media disposed within the frame, the filter media being configured for use as a diesel particulate filter and capable of being regenerated at a temperature greater than 350 degrees Celsius, the frame having a first surface and a second surface, the first surface having a first feature and the second surface having a second feature, the first feature being configured to mate with the second feature of another one of the plurality of filter elements and the first feature of each of the plurality of stackable elements is received in the second feature of an adjacent one of the plurality of stackable elements;
a first outer stackable element positioned on one end of the plurality of stackable elements, the first outer stackable element having a frame defining a perimeter surrounding a filter media disposed within the frame, the frame of the first outer stackable element having a first surface and a second surface, the second surface having a feature configured to mate with the first feature of one of the plurality of stackable elements adjacent to the first outer stackable element; and
a second outer stackable element positioned on another end of the plurality of stackable elements, the second outer stackable element having a frame defining a perimeter surrounding a filter media disposed within the frame, the frame of the second outer stackable element having a first surface and a second surface, the first surface having a feature configured to mate with the second feature of one of the plurality of stackable elements adjacent to the second outer stackable element, wherein the first surface of each of the plurality of stackable elements and the second outer stackable element further comprises an inlet opening on one end of the frame configured to align with an inlet opening on the second surface of each of the plurality of stackable elements and the first outer stackable element such that a plurality of openings are defined on alternating sides of the filter assembly, the plurality of openings providing fluid communication to the filter media and the first feature of each of the plurality of stackable elements and the feature of the second outer stackable element is a protrusion and the second feature of each of the plurality of stackable elements and the feature of the first outer stackable element is a recess configured to receive the protrusion each of the protrusions and the recesses being configured to only allow the inlet openings to be aligned when the protrusions are received within the recesses.

11. The filter assembly as in claim 10, further comprising a sealing material disposed between each of the first feature and the second feature of the plurality of stackable elements and the first and second outer stackable elements.

12. A filter assembly, comprising:
a plurality of stackable elements each comprising a frame defining a perimeter surrounding a filter media disposed within the frame, the filter media being configured for use as a diesel particulate filter and capable of being regenerated at a temperature greater than 350 degrees Celsius, the frame having a first surface and a second surface, the first surface having a first feature and the second surface having a second feature, the first feature being configured to mate with the second feature of another one of the plurality of filter elements and the first feature of each of the plurality of stackable elements is received in the second feature of an adjacent one of the plurality of stackable elements;
a first outer stackable element positioned on one end of the plurality of stackable elements, the first outer stackable element having a frame defining a perimeter surrounding a filter media disposed within the frame, the frame of the first outer stackable element having a first surface and a second surface, the second surface having a feature configured to mate with the first feature of one of the plurality of stackable elements adjacent to the first outer stackable element; and
a second outer stackable element positioned on another end of the plurality of stackable elements, the second outer stackable element having a frame defining a perimeter surrounding a filter media disposed within the frame, the flame of the second outer stackable element having a first surface and a second surface, the first surface having a feature configured to mate with the second feature of one of the plurality of stackable elements adjacent to the second outer stackable element, wherein the first surface of each of the plurality of stackable elements and the second outer stackable element further comprises an inlet opening on one end of the flame configured to align with an inlet opening on the second surface of each of the plurality of stackable elements and the first outer stackable element such that a plurality of openings are defined on alternating sides of the filter assembly, the plurality of openings providing fluid communication to the filter media and the first feature of each of the plurality of stackable elements and the feature of the second outer stackable element is a pair of protrusions disposed on opposite sides of the flame and adjacent to the inlet opening and the second feature of each of the plurality of stackable elements and the feature of the first outer stackable element is a pair of recesses disposed on opposite sides of the flame and adjacent to the inlet opening, the pair of recess being configured to receive the pair of protrusions.

13. The filter assembly as in claim 12, further comprising a sealing material disposed between each of the pair of protrusions and the pair of recesses of the plurality of stackable elements and the first and second outer stackable elements and each of the protrusions and the recesses being configured to only allow the inlet openings to be aligned when the protrusions are received within the recesses.

14. The filter assembly as in claim 13, wherein the sealing material is a sealing glass rigidly bonding the plurality of stackable elements, the first outer stackable element and the second stackable element together.

* * * * *